(12) United States Patent
Lee et al.

(10) Patent No.: US 12,196,624 B2
(45) Date of Patent: Jan. 14, 2025

(54) APPARATUS AND METHOD FOR ESTIMATING BODY TEMPERATURE

(71) Applicant: SAMSUNG ELECTRONICS CO., LTD., Suwon-si (KR)

(72) Inventors: So Young Lee, Suwon-si (KR); Sang Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 686 days.

(21) Appl. No.: 17/522,363

(22) Filed: Nov. 9, 2021

(65) Prior Publication Data

US 2023/0066222 A1 Mar. 2, 2023

(30) Foreign Application Priority Data

Aug. 30, 2021 (KR) .................. 10-2021-0114781

(51) Int. Cl.
*G01K 7/22* (2006.01)
*G01K 1/16* (2006.01)
*G01K 13/20* (2021.01)

(52) U.S. Cl.
CPC .............. *G01K 7/22* (2013.01); *G01K 1/165* (2013.01); *G01K 13/20* (2021.01)

(58) Field of Classification Search
CPC ........... G01K 7/22; G01K 13/20; G01K 1/165
See application file for complete search history.

(56) References Cited

U.S. PATENT DOCUMENTS

| 7,249,883 B2 | 7/2007 | Kuroda et al. |
| 8,226,294 B2 | 7/2012 | Bieberich et al. |
| 8,716,629 B2 | 5/2014 | Klewer et al. |

(Continued)

FOREIGN PATENT DOCUMENTS

| JP | 2007-212407 A | 8/2007 |
| JP | 2009-222543 A | 10/2009 |

(Continued)

OTHER PUBLICATIONS

Matweb, "Overview of materials for Silicone, RTV, Adhesive/Sealant Grade".*

(Continued)

*Primary Examiner* — Mirellys Jagan
(74) *Attorney, Agent, or Firm* — Sughrue Mion, PLLC

(57) ABSTRACT

An apparatus for estimating body temperature includes a sensor including a first sensor board; an object contact surface provided below the first sensor board; a thermally conductive material provided on an upper end of the first sensor board; a second sensor board provided on an upper end of the thermally conductive material; at least one first temperature sensor provided on the first sensor board and being configured to measure a surface temperature of the object; and at least one second temperature sensor provided on the second sensor board and being configured to measure a surface temperature of the thermally conductive material; and a processor configured to: measure a heat flux based on the surface temperature of the object and the surface temperature of the thermally conductive material; and estimate core temperature based on the measured heat flux and the surface temperature of the object.

18 Claims, 21 Drawing Sheets

(56) References Cited

U.S. PATENT DOCUMENTS

| | | | |
|---|---|---|---|
| 9,354,122 | B2 | 5/2016 | Bieberich et al. |
| 9,699,546 | B2 | 7/2017 | Qian et al. |
| 9,716,937 | B2 | 7/2017 | Qian et al. |
| 9,939,334 | B2 | 4/2018 | Yarden |
| 10,088,373 | B2 | 10/2018 | Durrer et al. |
| 10,260,965 | B2 | 4/2019 | Ikeda et al. |
| 10,274,383 | B2 | 4/2019 | Bieberich et al. |
| 10,405,755 | B2 | 9/2019 | Shrubsole et al. |
| 10,668,206 | B2 | 6/2020 | Newell et al. |
| 10,765,409 | B2 | 9/2020 | Lafon et al. |
| 10,830,649 | B2 | 11/2020 | Tsuchimoto |
| 11,071,814 | B2 | 7/2021 | Newell et al. |
| 11,090,423 | B2 | 8/2021 | Newell et al. |
| 11,090,424 | B2 | 8/2021 | Newell et al. |
| 2007/0225614 | A1 | 9/2007 | Naghavi et al. |
| 2013/0331728 | A1* | 12/2013 | Sun .................... G01K 1/165 600/549 |
| 2016/0213354 | A1 | 7/2016 | Levin et al. |
| 2019/0159680 | A1 | 5/2019 | Tanaka et al. |
| 2020/0037884 | A1* | 2/2020 | Ishida .................... A61B 5/01 |
| 2020/0060869 | A1 | 2/2020 | Telfort et al. |
| 2020/0085310 | A1 | 3/2020 | Zahner et al. |
| 2020/0217727 | A1 | 7/2020 | Heitz et al. |
| 2022/0087534 | A1* | 3/2022 | Mansky .................... A61B 5/01 |
| 2023/0104844 | A1* | 4/2023 | Tanaka .................... G01K 1/143 374/29 |

FOREIGN PATENT DOCUMENTS

| | | | | |
|---|---|---|---|---|
| JP | 2013-200152 | A | 10/2013 | |
| JP | 5898204 | B2 | 4/2016 | |
| WO | WO-2008078271 | A1 * | 7/2008 | ............... G01K 1/16 |
| WO | 2017/062923 | A1 | 4/2017 | |
| WO | WO-2019126607 | A1 * | 6/2019 | ............... A61B 5/01 |
| WO | 2020/171701 | A1 | 8/2020 | |
| WO | WO-2021220395 | A1 * | 11/2021 | ........... G01K 15/005 |

OTHER PUBLICATIONS

Matweb, "Overview of materials for Silicone Foam".*
The Engineering Toolbox, "Air-Thermophysical Properties".*

* cited by examiner

APPARATUS AND METHOD FOR ESTIMATING BODY TEMPERATURE

CROSS-REFERENCE TO RELATED APPLICATION(S)

This application is based on and claims priority to Korean Patent Application No. 10-2021-0114781, filed on Aug. 30, 2021, in the Korean Intellectual Property Office, the disclosure of which is incorporated by reference herein in its entirety.

BACKGROUND

1. Field

The following description relates to an apparatus and method for estimating biological characteristics, and in particular to an apparatus an method for estimating a core temperature using a plurality of sensors.

2. Description of the Related Art

Generally, body temperature is one of four vital signs and has very important clinical significance. A body temperature sensor may be used in various applications, such as checking infections in patients, thermal side effects of medications, time of ovulation in women, and the like. However, the skin temperature and deep body temperature may vary depending on external temperature. As such it is difficult to measure deep body temperature using a portable device such as a wearable device. A general body temperature sensor may be classified into a contact type sensor and a non-contact type sensor. Examples of the contact type sensor may include a sensor for detecting a change in electrical resistance, such as a Resistance Temperature Detector (RTD), a thermistor, etc., a thermocouple for detecting electromotive force, and the like. Further, examples of the non-contact type sensor may include a thermopile, a micro-bolometer, and the like, which measure body temperature by detecting infrared rays radiating from a body surface. A general body temperature measuring technology is affected significantly by a change in environment factors affecting heat transfer, such as a change in external ambient temperature, humidity, air flow, and the like.

SUMMARY

According to an aspect of the disclosure, an apparatus for estimating body temperature may include a sensor may include a first sensor board; an object contact surface provided below the first sensor board; a thermally conductive material provided on an upper end of the first sensor board; a second sensor board provided on an upper end of the thermally conductive material; at least one first temperature sensor provided on the first sensor board, the at least one first temperature sensor being configured to measure a surface temperature of the object; and at least one second temperature sensor provided on the second sensor board, the at least one second temperature sensor being configured to measure a surface temperature of the thermally conductive material; and a processor configured to: measure a heat flux based on the surface temperature of the object and the surface temperature of the thermally conductive material; and estimate core temperature based on the measured heat flux and the surface temperature of the object. A distance between the first sensor board and the object contact surface may be 10 mm or less.

The apparatus may further include a contact layer disposed on a lower end of the first sensor board, the contact layer being configured to contact the object.

The contact layer may have a thermal conductivity in a range of 1 W/mK to 500 W/mK.

A distance between the first sensor board and the second sensor board may be 10 mm or less.

The thermally conductive material may have a thermal conductivity of 0.1 W/mK or less.

The thermally conductive material may have a thickness in a range of 0.1 mm to 5 mm.

The thermally conductive material may include air.

At least one of the at least one first temperature sensor and at least one of the at least one second temperature sensor may be thermistors.

At least one of the at least one first temperature sensor and at least one of the at least one second temperature sensor may be disposed on a straight line facing each other.

The processor may be further configured to measure the heat flux based on a value obtained by subtracting the surface temperature of the object and the surface temperature of the thermally conductive material.

Estimating the core temperature of the object may include calculating a correction factor based on a thermal resistance value of the thermally conductive material and the heat flux; and combining a ratio between the heat flux and the calculated correction factor with the surface temperature of the object.

The apparatus may further include a first convection blocker spaced apart by a predetermined distance from the sensor, the first convection blocker being configured to block convection from an upper end of the sensor, and a second convection blocker configured to block convection from a side surface of the sensor.

The predetermined distance may be in a range of 0.1 mm to 10 mm.

The sensor may further include a heat flux increasing layer provided on an upper portion of the second sensor board and configured to increase the heat flux.

The heat flux increasing layer may have a thermal conductivity of 10 W/mK to 500 W/mK.

A method of estimating body temperature may include measuring, based on an output of a first temperature sensor disposed on a first sensor board of a sensor, a surface temperature of an object; measuring, based on an output of a second temperature sensor disposed on a second sensor board of the sensor, a surface temperature of a thermally conductive material disposed between the first sensor board and the second sensor board; measuring a heat flux based on the surface temperature of the object and the surface temperature of the thermally conductive material; and estimating a core temperature based on the measured heat flux and the surface temperature of the object.

The measuring of the heat flux may include measuring the heat flux based on a value obtained by subtracting the surface temperature of the object and the surface temperature of the thermally conductive material.

The estimating of the core temperature may include calculating a correction factor based on a thermal resistance value of the thermally conductive material and the heat flux; and combining a ratio between the heat flux and the calculated correction factor with the surface temperature of the object.

According to yet another aspect of the disclosure, an electronic device may include a main body and an apparatus for estimating body temperature, the apparatus for estimating body temperature being disposed in the main body. The apparatus for estimating body temperature may include a sensor comprising: a first sensor board; an object contact surface provided below the first sensor board; a thermally conductive material provided on an upper end of the first sensor board; a second sensor board provided on an upper end of the thermally conductive material; at least one first temperature sensor provided on the first sensor board, the at least one first temperature sensor being configured to measure surface temperature of the object; and at least one second temperature sensor provided on the second sensor board, the at least one second temperature sensor being configured to measure surface temperature of the thermally conductive material; and a processor configured to: measure a heat flux based on the surface temperature of the object and the surface temperature of the thermally conductive material; and estimate core temperature based on the measured heat flux and the surface temperature of the object. A distance between the first sensor board and the object contact surface may be 10 mm or less.

The electronic device may include at least one from among a smart watch, a smart band, smart glasses, a smart necklace, or an ear-type device.

BRIEF DESCRIPTION OF THE DRAWINGS

The above and other aspects and features of certain embodiments of the disclosure will be more apparent from the following description, taken in conjunction with the accompanying drawings, in which.

DETAILED DESCRIPTION

Figure 1:
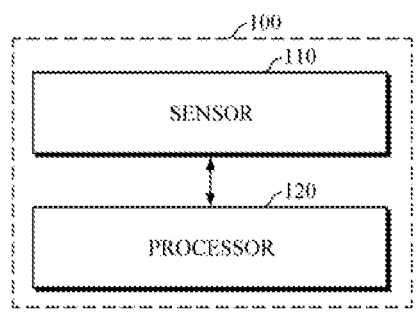
FIG. 1 is a block diagram of an apparatus for estimating body temperature according to an embodiment.

Details of example embodiments are included in the following detailed description and drawings. Advantages and features of the present invention, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising," "comprises," "includes," "including," "has," or "having" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof.

Throughout the disclosure, the expression "at least one of a, b or c" indicates only a, only b, only c, both a and b, both a and c, both b and c, all of a, b, and c, or variations thereof.

Figure 2:
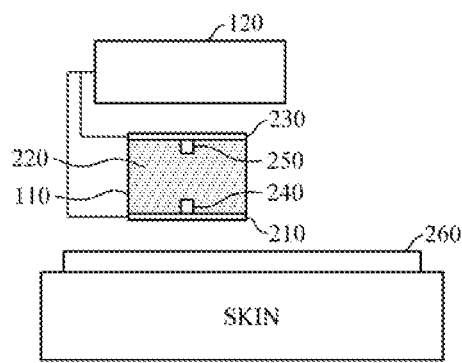
FIG. 2 is a diagram of a structure of an apparatus for estimating body temperature according to an embodiment.

FIG. 1 is a block diagram of an apparatus for estimating body temperature according to an embodiment. FIG. 2 is a diagram showing an example of a structure of an apparatus for estimating body temperature according to an embodiment.

Referring to FIG. 1, the apparatus 100 for estimating body temperature may include a sensor 110 and a processor 120.

The sensor 110 may obtain data for estimating core temperature from an object, and the processor 120 may estimate the core temperature of the object by using the data obtained from the sensor 110.

Referring to FIG. 2, the sensor 110 may include a first sensor board 210, a thermally conductive material 220, and a second sensor board 230. The first sensor board 210 may include a first temperature sensor 240, and the second sensor board 230 may include a second temperature sensor 250. However, the number of the first temperature sensors 240 and the second temperature sensors 250 is not limited to the illustrated example. The processor 120 may be electrically connected to the sensor 110, and may control the sensor 110 in response to a request for estimating body temperature.

The first sensor board 210 may be disposed near an object contact surface, and the second sensor board 230, which is disposed on an upper end of the thermally conductive material 220 positioned on an upper end of the first sensor board 210, may be disposed relatively far from the object contact surface. The first sensor board 210 and the second sensor board 230 may be a Printed Circuit Board (PCB). In addition, a distance between the first sensor board 210 and the object contact surface may be 10 mm or less, and a distance between the first sensor board 210 and the second sensor board 230 may be 10 mm or less.

The first sensor board 210 and the second sensor board 230 may be spaced apart from each other in a separated structure, or may be spaced apart from each other in a connected structure.

Figure 3:
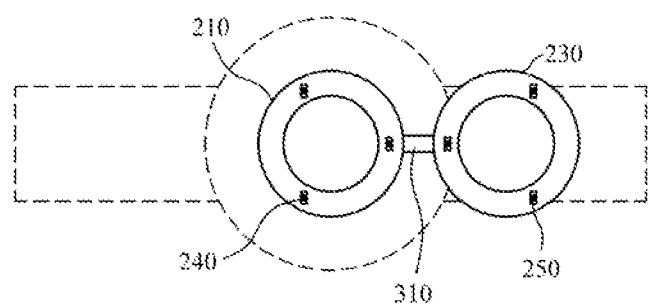
FIG. 3 is a diagram showing a connected structure of a first sensor board and a second sensor board according to an embodiment.

FIG. 3 is a diagram showing a connected structure of a first sensor board and a second sensor board according to an embodiment.

Referring to FIG. 3, the first sensor board 210 and the second sensor board 230, which may have a circular shape, may be connected to each other by a folded portion 310, and when the folded portion 310 is folded and disposed in a wearable device, the first sensor board 210 and the second sensor board 230 may be spaced apart from each other and may be disposed on a lower end and an upper end thereof, respectively. In this case, the folded portion 310 may be 5 mm or less in diameter, and an outer edge of the first sensor board 210 and the second sensor board 230 may have a diameter of 23 mm or less, and an inner edge thereof may have a diameter of 15 mm or less.

Referring back to FIG. 2, the thermally conductive material 220 may be, for example, an insulating material having a thickness of 0.1 mm to 5 mm, and may be a material having a thermal conductivity of 0.1 W/mK or less (e.g., polyurethane foam). Further, an air-filled structure may also be provided in which air having a very low thermal conductivity is filled between the first sensor board 210 and the second sensor board 230 without using a separate material therebetween.

The first temperature sensor 240 may be disposed on the first sensor board 210 and may measure surface temperature of an object; and the second temperature sensor 250 may be disposed on the second sensor board 230 and may measure surface temperature of the thermally conductive material 220. At least one or more first temperature sensors 240 and second temperature sensors 250 may be disposed on the first sensor board 210 and the second sensor board 230, respectively, and at least one of the first temperature sensors 240 and at least one of the second temperature sensors 250 may include a thermistor.

Figure 4A:
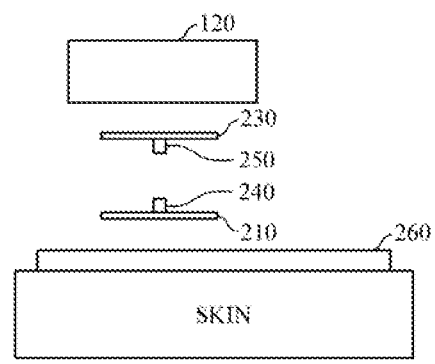
FIGS. 4A through 4C are diagrams showing example arrangements of a first temperature sensor and a second temperature sensor according to various embodiment.
Figure 4B:
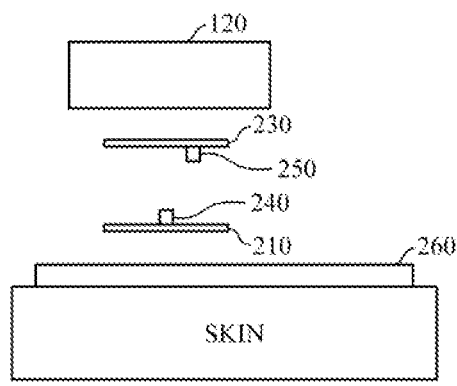
Figure 4C:
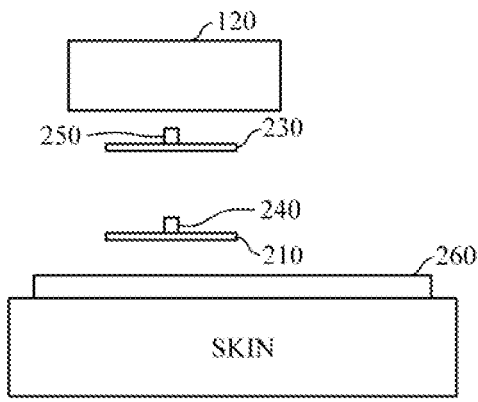

FIGS. 4A to 4C are diagrams showing an arrangement of a first temperature sensor and a second temperature sensor according to an embodiment.

Referring to FIGS. 4A to 4C, the first temperature sensor 240 and the second temperature sensor 250 may be disposed as a pair, and may be disposed on a straight line facing each other, or may be disposed on a diagonal line, but the arrangement is not limited thereto. The first temperature sensor 240 and the second temperature sensor 250 may be attached to an upper portion or a lower portion of the first sensor board 210 and the second sensor board 230, respectively. A plurality of pairs of the first temperature sensors 240 and the second temperature sensors 250 may be disposed on the first sensor board 210 and the second sensor board 230, respectively. For example, body temperature may be estimated by using an average of measured values which are measured by the respective pairs, and body temperature may be estimated by obtaining an average of measured values which are measured by a plurality of first temperature sensors 240 and an average of measured values which are measured by a plurality of second temperature sensors 250. Further, body temperature may be estimated by excluding a pair determined to be in poor contact with the object among the plurality of pairs. For example, by excluding a minimum value and a maximum value among the measured values which are measured by the plurality of pairs, body temperature may be estimated by using the remaining measured values.

Referring to FIGS. 2 and 4A to 4C, the apparatus for estimating body temperature may further include a contact layer 260 disposed on a lower end of the first sensor board 210, and for contacting the object (e.g. skin).

The contact layer 260 may be made of a material having a high thermal conductivity of 1 W/mK to 500 W/mK, and when applied to, e.g., a wristwatch-type wearable device, the contact layer 260 may be formed as a rear case.

The processor 120 may measure a heat flux based on the surface temperature of the object, which is measured by the first temperature sensor 240, and the surface temperature of the thermally conductive material which is measured by the second temperature sensor 250, and may estimate core temperature based on the measured heat flux and the surface temperature of the object.

For example, the processor 120 may estimate a heat flux based on a value obtained by subtracting the surface temperature of the object and the surface temperature of the thermally conductive material 220, and the processor 120 may estimate the core temperature by calculating a correction factor based on a thermal resistance value of the thermally conductive material 220 and the measured heat flux, and by combining a ratio between the measured heat flux and the calculated correction factor with the surface temperature of the object.

Figure 5:
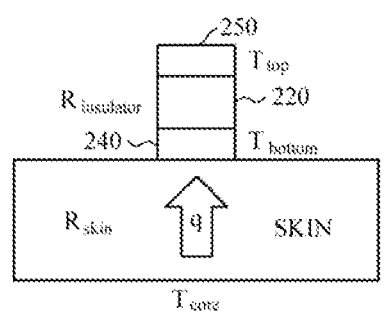
FIGS. 5 and 6 are diagrams showing an example of estimating core temperature of an object based on a heat flux measured using a sensor according to an embodiment.
Figure 6:
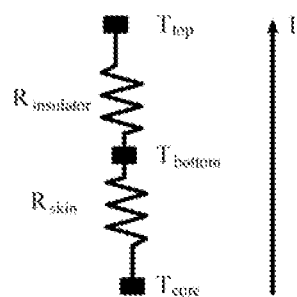

FIGS. 5 and 6 are diagrams showing an example of estimating core temperature of an object based on a heat flux measured using a sensor according to an embodiment.

Referring to FIGS. 5 and 6, a difference between the core temperature $T_{core}$ and the surface temperature $T_{bottom}$ of the object may be represented by the heat flux q. Assuming that heat transfer from a deep portion is formed by a series circuit, the same heat flux q may also be measured based on a temperature difference $T_{bottom}-T_{top}$ between the surface temperature of the object, which is measured by the first temperature sensor 240, and the surface temperature $T_{top}$ of the thermally conductive material 220 which is measured by the second temperature sensor 250. In this case, regarding the heat transfer of the first temperature sensor 240 and the second temperature sensor 250 is shown by the following Equation 1.

$$I = \frac{T_{core} - T_{bottom}}{R_{Skin}} = \frac{T_{bottom} - T_{top}}{R_{insulator}} \quad \text{[Equation 1]}$$

Herein, $R_{skin}$ denotes skin resistance, $R_{insulator}$ denotes heat resistance of the thermally conductive material, and I denotes a thermoelectric current, in which I of Equation 1 may be represented by the following Equation 2.

$$\frac{T_{core} - T_{bottom}}{T_{bottom} - T_{top}} = \frac{R_{Skin}}{R_{insulator}} = \frac{1}{\beta} \quad \text{[Equation 2]}$$

Herein, $\beta$ denotes the correction factor. That is, the processor 120 may calculate the correction factor $\beta$ based on the heat resistance $R_{insulator}$ of the thermally conductive material 200 and the heat flux $(T_{bottom}-T_{top})$.

Equation 2 may be represented by the following Equation 3.

$$\hat{T}_{core} = T_{bottom} + \frac{T_{bottom} - T_{top}}{\beta} \quad \text{[Equation 3]}$$

Herein, $\hat{T}_{core}$ denotes a vector value of $T_{core}$. That is, the processor 120 may estimate core temperature of the object by combining a ratio between the measured heat flux $(T_{bottom}-T_{top})$ and the correction factor $\beta$ with the surface temperature $T_{bottom}$ of the object.

Figure 7:
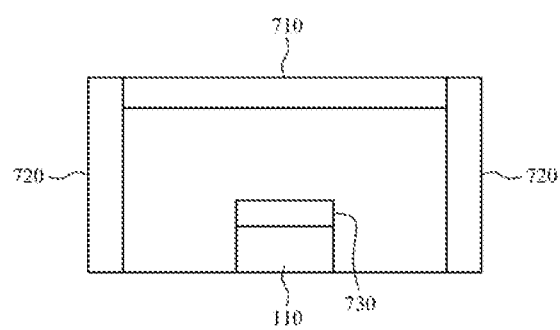
FIG. 7 is a diagram showing another example of a structure of an apparatus for estimating body temperature according to an embodiment.

FIG. 7 is a diagram showing a structure of an apparatus for estimating body temperature according to an embodiment.

Referring to FIG. 7, the apparatus for estimating body temperature according to an embodiment may further include: a first convection blocking part 710 spaced apart by a predetermined distance from the sensor 110, and configured to block convection from an upper end of the sensor 110; and a second convection blocking part 720 configured to block convection from the sides of the sensor 110, in which the sensor 110 in the apparatus for estimating body temperature may further include a heat flux increasing part 730 disposed on an upper portion of the second sensor board 230 and configured to increase a heat flux.

Generally, heat transfer is affected by convection, in addition to conduction. Based on heat transferred to an electronic device from a deep portion through the surface of an object, the apparatus for estimating body temperature in the electronic device may estimate core temperature, in which case it is required to minimize the effect of convection generated within the electronic device. That is, it is required to block convection from heat generated by various other components, e.g., sensor, battery, processor, etc., in the electronic device in order to measure core temperature accurately.

Referring to FIG. 7, the first convection blocking part 710 may be spaced apart by a predetermined distance from the upper end of the sensor 110 and may block convection from the upper portion thereof, and the second convection blocking part 720 may be spaced apart by a predetermined distance from the sides of the sensor 110 and may block convection from the sides thereof. In this case, the predetermined distance may be in a range of 0.1 mm to 10 mm, respectively. The first convection blocking part 710 and the second convection blocking part 720 may be made of a material, e.g., Ethylene Vinyl Acetate (EVA), foam, plastic, and diatomite, having a thermal conductivity of 1 W/mK or less. Further, the first convection blocking part 710 and the second convection blocking part 720 may be, for example, a separate structure which is additionally included in the electronic device, or may be a structure originally included in the electronic device, and may be, for example, a PCB or a watch case which is disposed to surround the sensor.

When the first convection blocking part 710 and the second convection blocking part 720 are used, heat transfer from the deep portion may be reduced by the blocking effect, thereby reducing the heat flux, which may be compensated by using the heat flux increasing part 730.

The sensor 110 may further include the heat flux increasing part 730 disposed on the upper end of the sensor 110, particularly on the top of the second sensor board 230. The heat flux increasing part 730 may be made of a material having a relatively high thermal conductivity of 10 W/mK to 500 W/mK, such that the upper end of the sensor 110 may be easily cooled, which increases a temperature difference between the deep portion and the upper end of the sensor 110, thereby obtaining the effect of increasing the heat flux. The heat flux increasing part 730 may be disposed even on a lower end of the sensor 110, in which case a structure in the electronic device, e.g., the contact layer 260, may be replaced.

FIGS. 8A through 8D are graphs showing core temperature measured using a common thermometer, and core temperature measured using a heat flux according to an embodiment.

Figure 8A:
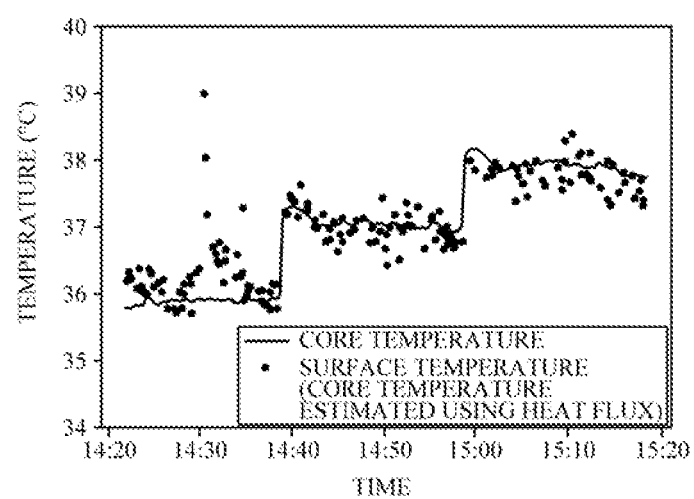
FIGS. 8A to 8D are graphs showing core temperature measured using a common thermometer, and core temperature measured using a heat flux according to an embodiment.
Figure 8B:
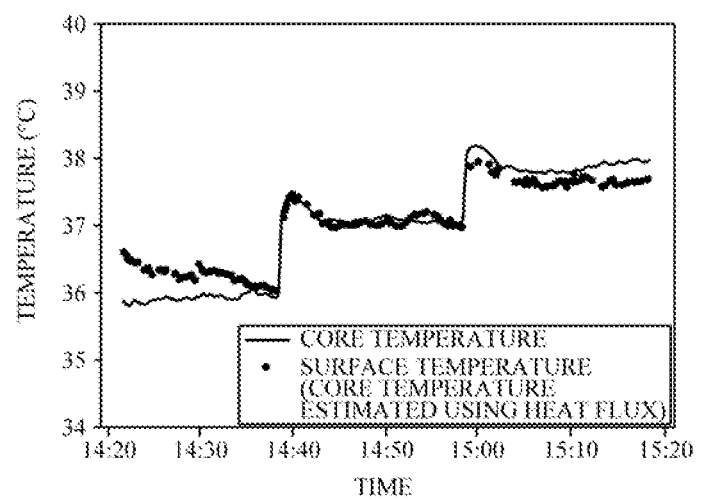
Figure 8C:
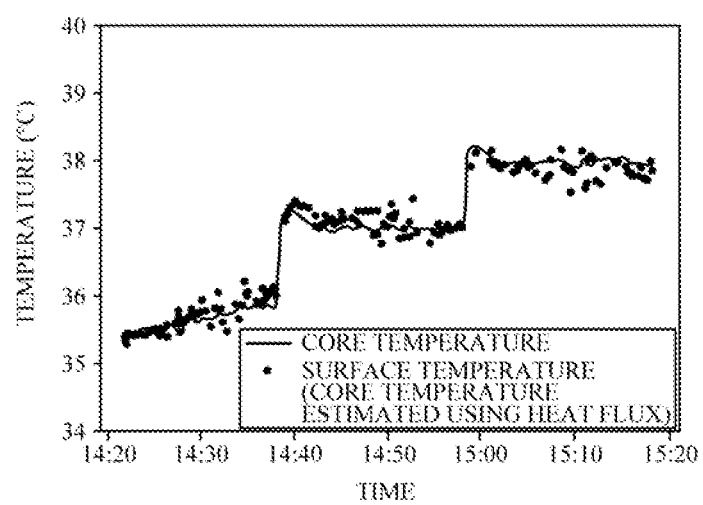
Figure 8D:
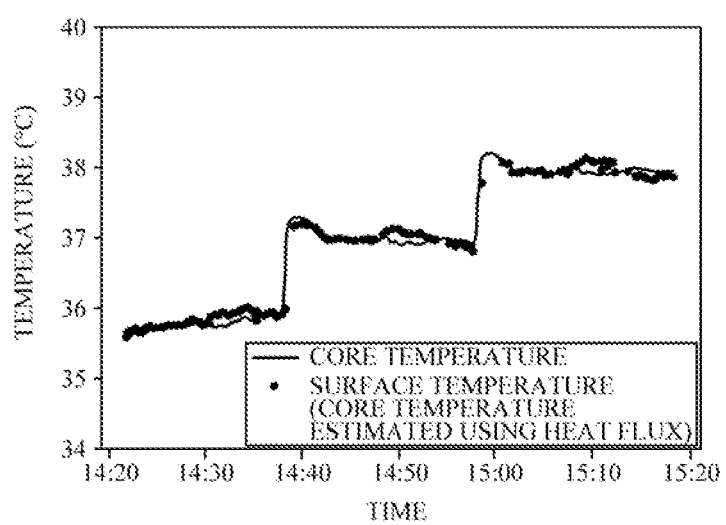

Particularly, in measurement of the core temperature by using the heat flux, FIG. 8A shows a case where the convection blocking part or the heat flux increasing part are not provided; FIG. 8B shows a case where only the convection blocking part is provided; FIG. 8C shows a case where only the heat flux increasing part is provided; and FIG. 8D shows a case where both the convection blocking part and the heat flux increasing part are provided. By placing a structure imitating human body tissue on a hot plate, and by increasing temperature of the hot plate, the heat flux was measured using a first temperature sensor and a second temperature sensor which are sensors disposed on the structure, and the core temperature was estimated over time (indicated by dots in FIGS. 8A through 8D). Further, the core temperature was measured on a contact surface between the hot plate and the structure (indicated by lines in FIGS. 8A through 8D). Upon obtaining a regression equation by randomly selecting 30% of the whole data using simple linear regression, the core temperature was estimated for the remaining 70% of the data. By generating convection using a fan at around 14:30, 14:50, and 15:10, performance of estimating the core temperature of each sensor structure, corresponding to FIGS. 8A through 8D, was compared.

Referring to FIGS. 8A through 8D, it can be seen that in the case where there is no convection blocking part or heat flux increasing part as shown in FIG. 8A, there is a large difference between an actually measured core temperature and core temperature estimated by the heat flux. In the case where there is only the convection blocking part as shown in FIG. 8B and in the case where there is only the heat flux increasing part as illustrated in FIG. 8C, there is also a large difference between the actually measured core temperature and the core temperature estimated by the heat flux. However, as illustrated in FIG. 8D, in the case where both the convection blocking part and the heat flux increasing part are disposed, there is a slight difference between the actually measured core temperature and the core temperature estimated by the heat flux.

According to embodiments, convection may be blocked, which may cause an error when the core temperature is measured using the heat flux, and the heat flux may be compensated by the convection blocking effect, thereby increasing accuracy in estimating the core temperature.

Figure 9:
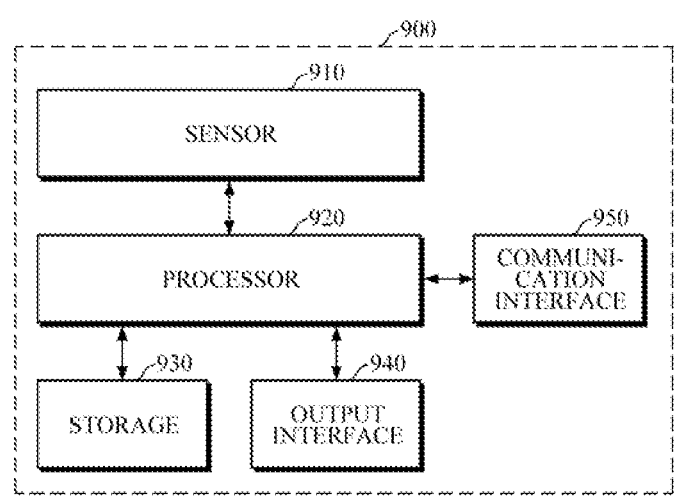
FIG. 9 is a block diagram showing an apparatus for estimating body temperature according to an embodiment.

FIG. 9 is a block diagram showing an apparatus for estimating body temperature according to another embodiment.

Referring to FIG. 9, the apparatus 900 for estimating body temperature may include a sensor 910, a processor 920, a storage 930, an output interface 940, and a communication interface 950. In this case, the sensor 910 and the processor 920 are the same as the sensor 110 and the processor 120 of FIG. 1, such that a detailed description thereof will be omitted.

The storage 930 may store information related to estimating the core temperature. For example, the storage 930 may store surface temperature of an object, surface temperature of a thermally conductive material, and processing results, such as heat flux, correction factor, etc., of the processor 920.

The storage 930 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 940 may provide the processing results of the processor 920 for a user. For example, the output interface 940 may display an estimate body temperature value of the processor 920 on a display. In this case, if the estimated body temperature value falls outside a normal range, the output interface 940 may provide a user with warning information by changing color, line thickness, etc., or displaying the abnormal value along with a normal range, so that the user may easily recognize the abnormal value. Further, along with or without the visual output, the output interface 940 may provide an estimated core temperature value for the user in a non-visual manner by voice, vibrations, tactile sensation, and the like using an audio output module such as a speaker, or a haptic module and the like.

The communication interface 950 may communicate with an external device to transmit and receive various data, related to estimating core temperature, to and from the external device. In this case, the external device may include an information processing device such as a smartphone, a tablet PC, a desktop computer, a laptop computer, and the like. For example, the communication interface 950 may transmit a body temperature estimation result to the external device, such as a user's smartphone and the like, so that the user may manage and monitor the estimation result by using a device having a relatively high performance.

In this case, the communication interface 950 may communicate with the external device by using various wired or wireless communication techniques, such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G communication, 4G communication, 5G communication, and the like. However, this is merely exemplary and is not intended to be limiting.

Figure 10:
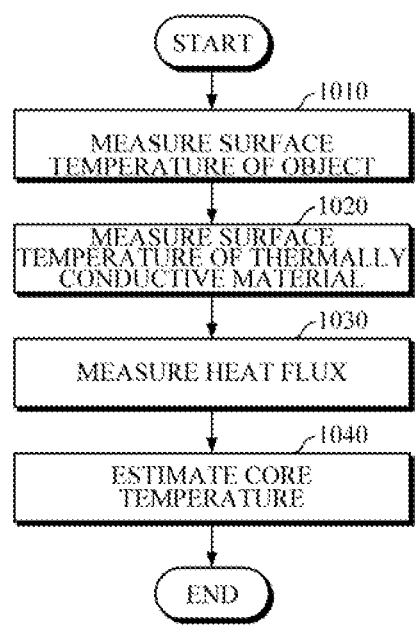
FIG. 10 is a flowchart of a method of estimating body temperature according to an embodiment.

FIG. 10 is a flowchart illustrating a method of estimating body temperature according to an embodiment.

The method of FIG. 10 is an example of a method of estimating body temperature which is performed by the apparatuses 100 and 900 for estimating body temperature according to the embodiments of FIGS. 1 and 9, which are described above in detail, and thus will be briefly described below in order to avoid redundancy.

Referring to FIG. 10, the apparatus for estimating body temperature may measure surface temperature of an object by using the first temperature sensor disposed on the first sensor board of the sensor in 1010. The first sensor board may be disposed near an object contact surface, and a distance between the first sensor board and the object contact surface may be 10 mm or less.

Then, the apparatus for estimating body temperature may measure surface temperature of a thermally conductive material, disposed between the first sensor board and the second sensor board, by using the second temperature sensor disposed on the second sensor board of the sensor in 1020.

The thermally conductive material may be, for example, an insulating material having a thickness of 0.1 mm to 5 mm, and may be a material having a thermal conductivity of 0.1 W/mK or less (e.g., polyurethane foam). Further, an air-filled structure may also be provided in which air having a very low thermal conductivity is filled between the first sensor board and the second sensor board without using a separate material therebetween. A distance between the first sensor board and the second sensor board may be 10 mm or less.

Subsequently, the apparatus for estimating body temperature may measure a heat flux based on the surface temperature of the object and the surface temperature of the thermally conductive material in 1030. For example, the apparatus for estimating body temperature may measure the heat flux based on a value obtained by subtracting the surface temperature of the object and the surface temperature of the thermally conductive material 220.

Next, the apparatus for estimating body temperature may estimate core temperature based on the measured heat flux and the surface temperature of the object in 1040. For example, the apparatus for estimating body temperature may calculate a correction factor based on a resistance value of the thermally conductive material and the heat flux, and may estimate the core temperature of the object by combining a ratio between the heat flux and the calculated correction factor with the surface temperature of the object.

FIGS. 11 through 16 show examples of electronic devices including the apparatuses 100 and 900 for estimating body temperature according to various embodiments. Examples of the electronic device may include not only a smartphone, but also a smart watch, a smart band, smart glasses, a smart necklace, and an ear-wearable device, but the electronic device is not limited thereto.

Figure 11:
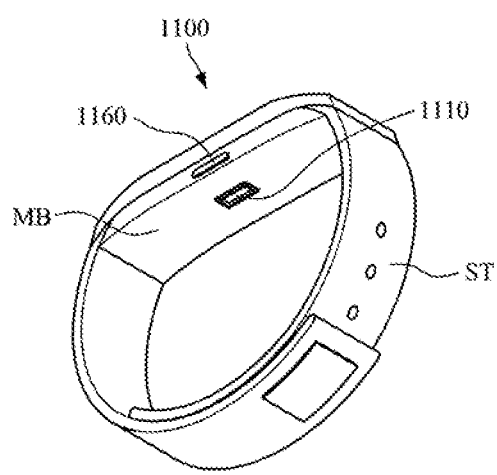
FIGS. 11 through 16 are diagrams showing examples of structures of electronic devices including apparatuses for estimating body temperature according to various embodiments.

Referring to FIG. 11, the electronic device may be implemented as a smart watch-type wearable device 1100, which includes a main body MB and a wrist strap ST.

The main body MB may be formed in various shapes, and a battery may be embedded in the main body MB and/or the strap ST to supply power to various components of the wearable device. The strap ST may be connected to both ends of the main body to allow the main body to be worn on a user's wrist, and may be flexible so as to be wrapped around the user's wrist. The strap ST may be composed of a first strap and a second strap which are separated from each other. One ends of the first strap and the second strap are connected to both sides of the main body MB, and the other ends thereof may be connected to each other via a connecting means. In this case, the connecting means may be formed as magnetic connection, Velcro connection, pin connection, and the like, but is not limited thereto. Further, the strap ST is not limited thereto, and may be integrally formed as a non-detachable band.

The main body MB may include the apparatus for estimating body temperature. A sensor 1110, a processor, an output interface, a storage, and a communication interface may be mounted in the apparatus for estimating body temperature. However, depending on the size and shape of a form factor and the like, some of the display, the storage, and the communication interface may be omitted.

The sensor 1110 may include the first sensor board disposed near an object contact surface; a thermally conductive material disposed on an upper end of the first sensor board; the second sensor board disposed on an upper end of the thermally conductive material; at least one first temperature sensor disposed on the first sensor board and configured to measure surface temperature of the object; and at least one second temperature sensor disposed on the second sensor board and configured to measure surface temperature of the thermally conductive material. The sensor 1110 may be disposed on a rear surface of the main body MB, so that when worn on the user's wrist, the main body MB may come into contact with an upper part of the wrist to obtain data for measuring core temperature from the wrist. A distance between the first sensor board and the object contact surface may be 10 mm or less.

Figure 12:
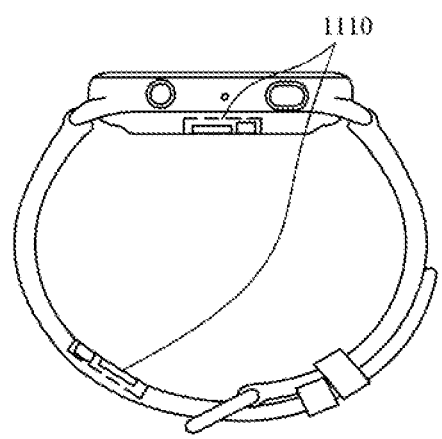

Referring to FIG. 12, the sensor 1110 may be disposed not only on the rear surface of the main body MB but also on the wrist strap ST to obtain data.

Referring back to FIG. 11, the manipulator 1160 may be formed on a side surface of the main body MB, as illustrated herein. The manipulator 1160 may receive a user's command and may transmit the received command to the processor. In addition, the manipulator 1160 may have a power button to turn on/off the wearable device 1100.

The processor mounted in the main body MB may be electrically connected to various components including the sensor 1110. The processor may estimate the core temperature of the object by using data obtained from a plurality of sensors 1110. For example, the processor may measure a heat flux based on the surface temperature of the object and the surface temperature of the thermally conductive material, and may estimate the core temperature based on the measured heat flux and the surface temperature of the object.

The display may be provided on a front surface of the main body MB and may display various application screens, including body temperature information, time information, received message information, and the like. For example, the display may display an estimated core temperature value. In this case, if the estimated body temperature value falls outside a normal range, the processor may provide a user with warning information by changing color, line thickness, etc., or displaying the abnormal value along with a normal range, so that the user may easily recognize the abnormal value. Further, in response to a user's request, the processor may display not only the current estimated core temperature value, but also continuous estimated core temperature values over time and may provide the values to the user. In addition, the processor may display a variation in body temperature, e.g., a body temperature change during a day in graph form, and information as to whether the user has a deep sleep based on the body temperature change on the display.

Figure 13:
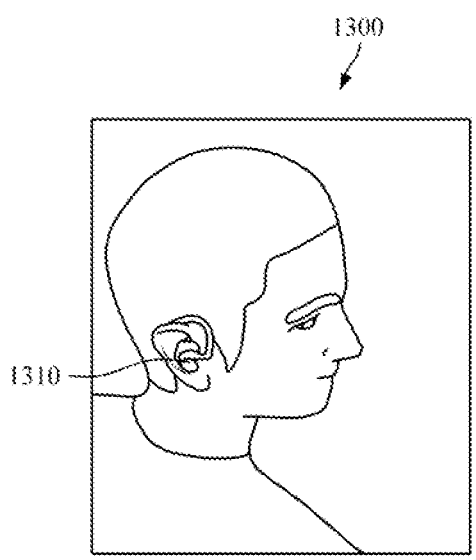

Referring to FIG. 13, the electronic device may be implemented as an ear-wearable device 1300.

The ear-wearable device 1300 may include a main body and an ear strap. A user may wear the ear-wearable device 1300 by hanging the ear strap on the user's auricle. The ear strap may be omitted depending on the shape of ear-wearable device 1300. The main body may be inserted into the external auditory meatus. A sensor device 1310 may be mounted in the main body. The ear-wearable device 1300 may provide the user with a component estimation result as sounds, or may transmit the estimation result to an external device, e.g., a mobile device, a tablet PC, a personal computer, etc., through a communication module provided in the main body.

Figure 14:
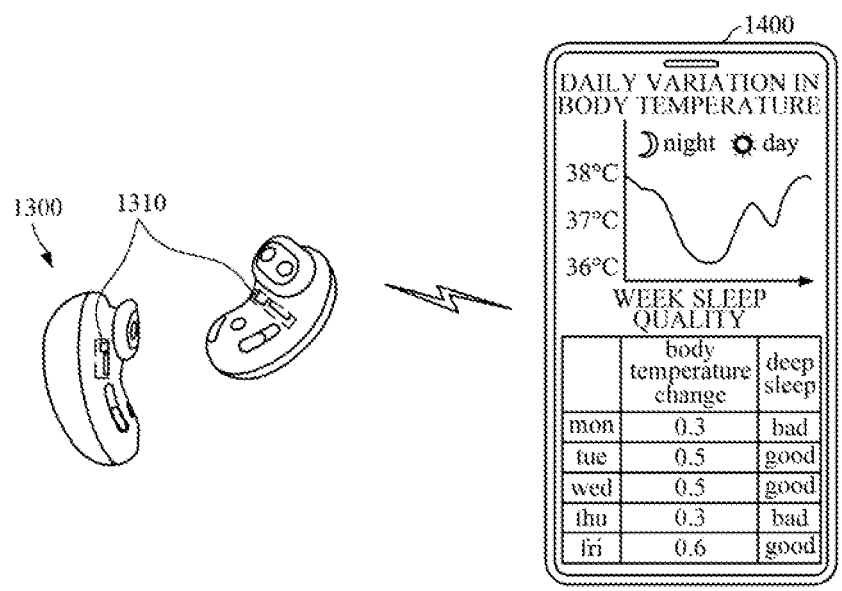

Referring to FIG. 14, the electronic device may be implemented by a combination of an ear-wearable device and a smartphone. However, this is merely an example, and various other combinations of electronic devices may be provided. For example, a processor for estimating core temperature may be mounted in a main body of the smartphone 1400. Upon receiving a request for estimating body temperature, the processor may communicate with a communication module mounted in the main body of the wearable device 1300, to obtain data from the sensor 1310. Further, upon receiving data, such as heat flux, surface temperature, etc., from the wearable device 1300, the processor may estimate core temperature and may output an estimation result to the display of the smartphone 1400 through an output module as illustrated herein.

Figure 15:
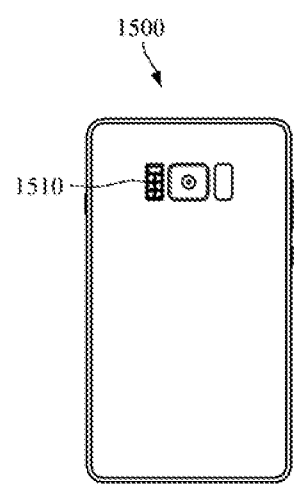

Referring to FIG. 15, the electronic device may be implemented as a mobile device 1500 such as a smartphone.

The mobile device 1500 may include a housing and a display panel. The housing may form an exterior of the mobile device 1500. The housing has a first surface, on which a display panel and a cover glass may be disposed sequentially, and the display panel may be exposed to the outside through the cover glass. A sensor 1510, a camera module and/or an infrared sensor, and the like may be disposed on a second surface of the housing.

For example, a plurality of sensors for obtaining data from a user may be disposed on a rear surface of the smartphone 1500, including a fingerprint sensor disposed on the front surface of the main body, a power button or a volume button disposed on a side surface of the main body, a sensor disposed on other positions of the front or rear surfaces of the main body, and the like, so as to estimate core temperature.

In addition, when a user transmits a request for estimating body temperature by executing an application and the like installed in the mobile device 1500, the mobile device 1500 may obtain data by using the sensor 1510, may estimate the core temperature by using a processor in the mobile device 1500, and may provide the estimated value as images and/or sounds to the user.

Figure 16:
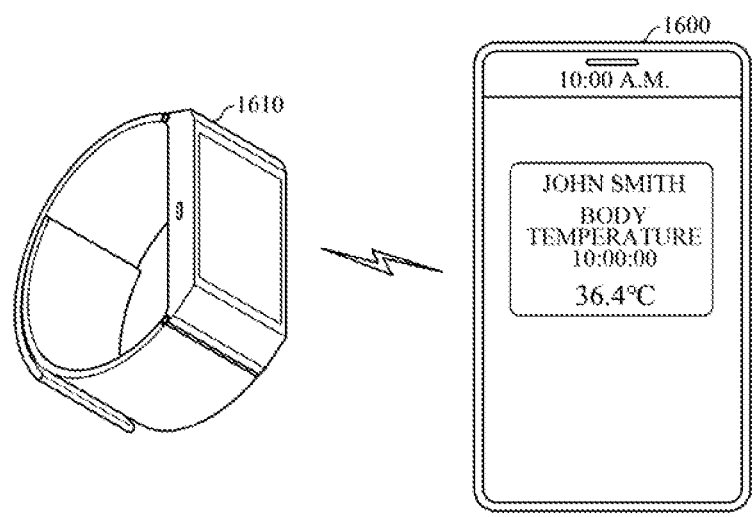

Referring to FIG. 16, the electronic device may be implemented as a combination of a wristwatch-type wearable device and a smartphone. For example, a processor for estimating core temperature may be mounted in a main body of the smartphone 1600. In response to receiving a request for measuring body temperature, the processor of the smartphone 1600 may communicate with a communication module, mounted in the main body of the wearable device 1610, to obtain data through the communication module. Further, upon receiving data, such as surface temperature of the object and the like, from the wearable device 1610, the processor may estimate the core temperature and may output an estimation result to a display of the smartphone 1600 through an output module, as illustrated herein. In this case, in response to a user's request, the processor may display not only a current estimated core temperature value, but also continuous estimated core temperature values over time and may provide the values to the user. In addition, the processor may display a variation in body temperature, e.g., a body temperature change during a day in graph form, and information as to whether the user has a deep sleep based on the body temperature change on the display.

The disclosed numerical ranges we selected to satisfy form-factor when used as a wearable device.

The embodiments can be implemented as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily deduced by programmers of ordinary skill in the art to which the invention pertains.

Example embodiments have been described herein. However, it will be obvious to those skilled in the art that various changes and modifications can be made without changing technical conception and essential features of the present disclosure. Thus, it is clear that the above-described embodiments are illustrative in all aspects and are not intended to limit the present disclosure.

What is claimed is:

1. An apparatus for estimating a temperature of an object, the apparatus comprising:
a sensor comprising:
a first sensor board;
a thermally conductive material provided on an upper end of the first sensor board;
a second sensor board provided on an upper end of the thermally conductive material;
at least one first temperature sensor provided on the first sensor board, the at least one first temperature sensor being configured to measure a surface temperature of the object; and
at least one second temperature sensor provided on the second sensor board, the at least one second temperature sensor being configured to measure a surface temperature of the thermally conductive material; and
a processor configured to:
measure a heat flux based on the surface temperature of the object and the surface temperature of the thermally conductive material;
calculate a correction factor based on a thermal resistance value of the thermally conductive material and the heat flux; and
estimate a core temperature of the object based on a combination of the surface temperature of the object with a ratio between the heat flux and the calculated correction factor.

2. The apparatus of claim 1, wherein a distance between the first sensor board and the second sensor board is 10 mm or less.

3. The apparatus of claim 1, wherein the thermally conductive material has a thermal conductivity of 0.1 W/mK or less.

4. The apparatus of claim 1, wherein the thermally conductive material has a thickness in a range of 0.1 mm to 5 mm.

5. The apparatus of claim 1, wherein the thermally conductive material comprises air.

6. The apparatus of claim 1, wherein at least one of the at least one first temperature sensor and at least one of the at least one second temperature sensor are thermistors.

7. The apparatus of claim 1, wherein at least one of the at least one first temperature sensor and at least one of the at least one second temperature sensor are disposed on a straight line facing each other.

8. The apparatus of claim 1, wherein the processor is further configured to measure the heat flux based on a value obtained by subtracting the surface temperature of the object and the surface temperature of the thermally conductive material.

9. The apparatus of claim 1, further comprising a contact layer disposed on a lower end of the first sensor board, the contact layer being configured to contact the object.

10. The apparatus of claim 9, wherein the contact layer has a thermal conductivity in a range of 1 W/mK to 500 W/mK.

11. The apparatus of claim 1, further comprising a first convection blocker spaced apart by a predetermined distance from the sensor, the first convection blocker being configured to block convection from an upper end of the sensor, and a second convection blocker configured to block convection from a side surface of the sensor.

12. The apparatus of claim 11, wherein the predetermined distance is in a range of 0.1 mm to 10 mm.

13. The apparatus of claim 1, wherein the sensor further comprises a heat flux increasing layer provided on an upper portion of the second sensor board and configured to increase the heat flux.

14. The apparatus of claim 13, wherein the heat flux increasing layer has a thermal conductivity of 10 W/mK to 500 W/mK.

15. A method of estimating a temperature of an object, the method comprising:
measuring, based on an output of a first temperature sensor disposed on a first sensor board of a sensor, a surface temperature of an object;
measuring, based on an output of a second temperature sensor disposed on a second sensor board of the sensor, a surface temperature of a thermally conductive material disposed between the first sensor board and the second sensor board;
measuring a heat flux based on the surface temperature of the object and the surface temperature of the object of the thermally conductive material;
calculating a correction factor based on a thermal resistance value of the thermally conductive material and the heat flux; and
estimating a core temperature based on a combination of the surface temperature of the object with a ratio between the heat flux and the calculated correction factor.

16. The method of claim 15, wherein the measuring of the heat flux comprises measuring the heat flux based on a value obtained by subtracting the surface temperature of the object and the surface temperature of the thermally conductive material.

17. An electronic device comprising:
a sensor comprising:
a first sensor board;
a second sensor board which is spaced apart from the first sensor board;
a thermally conductive material provided between the first sensor board and the second sensor board;
a second sensor board provided on an upper end of the thermally conductive material;
at least one first temperature sensor provided on the first sensor board and configured to measure a surface temperature of an object;
at least one second temperature sensor provided on the second sensor board, and configured to measure a surface temperature of the thermally conductive material; and
a heat flux increasing layer provided on the second sensor board and configured to increase a heat flux; and
a processor configured to:
measure the heat flux based on the surface temperature of the object and the surface temperature of the thermally conductive material; and
estimate a core temperature of the object based on the heat flux and the surface temperature of the object.

18. The electronic device of claim 17, further comprising:
a first convection blocker spaced apart by a predetermined distance from the sensor and configured to block convection from an upper end of the sensor; and
a second convection blocker configured to block convection from a side surface of the sensor.

* * * * *